Sept. 23, 1969    W. M. NELSON    3,468,995
PRODUCING PLASTIC FILM

Filed Oct. 17, 1966    2 Sheets-Sheet 2

INVENTOR.
W. M. NELSON
BY
*Young & Quigg*
ATTORNEYS

United States Patent Office 3,468,995
Patented Sept. 23, 1969

3,468,995
PRODUCING PLASTIC FILM
William M. Nelson, Bartlesville, Okla., assignor to Phillips Petroleum Company, a corporation of Delaware
Filed Oct. 17, 1966, Ser. No. 587,080
Int. Cl. B29c *17/04;* B29d *23/04*
U.S. Cl. 264—95                                                   7 Claims

ABSTRACT OF THE DISCLOSURE

A plastic film is quenched by contact with a surface having means for circulation of quenched liquid in contact therewith for cooling and being porous to permit a portion of said quench liquid to pass therethrough for lubrication and quench.

This invention relates to the production of plastic film. In another aspect this invention relates to the cooling and treating of plastic film. In another aspect this invention relates to quenching plastic films. In still another aspect this invention relates to improving the optical properties of plastic film.

Extruded plastic film is conventionally made by extrusion through a slot die to form flat film or by extrusion in the form of a tube, with expansion of the tube which is collapsed for wind-up. In either method, it is desirable to rapidly cool the extruded film to obtain improved optical and physical properties. Film made by extrusion through a slot die is often quenched in a water bath or by chilled rolls while tubular film is cooled by blowing air or gas, which can be chilled, around the periphery of the tube. In order to achieve high film throughput and to improve the optical and other properties of the film, it is desirable to have a process which increases the film cooling rate beyond that attainable with blown air and without the expense and limitations associated with a water bath or chill rolls.

Accordingly, it is an object of the invention to quench extruded plastic film.

Another object is to improve the optical and physical properties of extruded plastic film.

Another object is to effect economies and increase rates in the production of plastic film.

Figure 1:
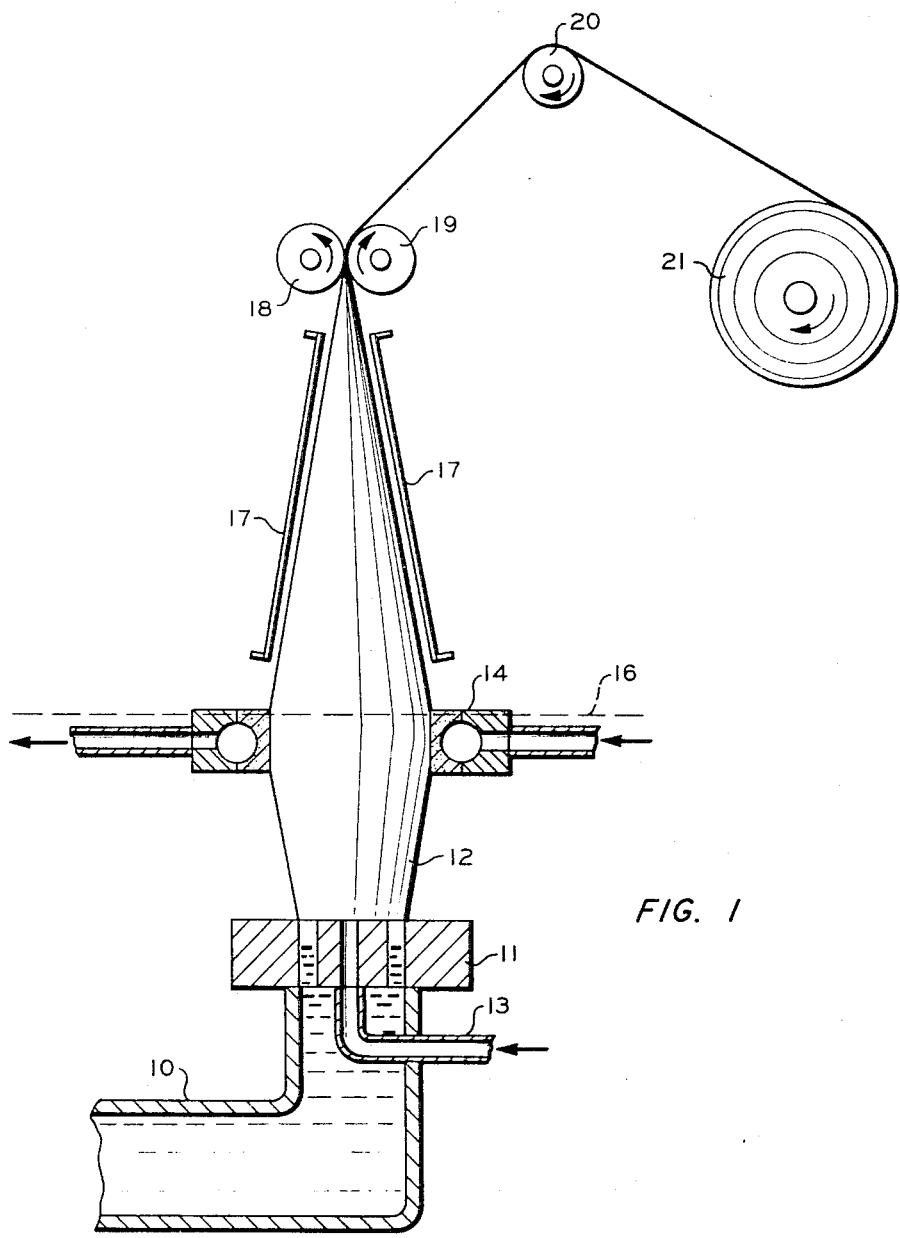
FIGURE 1 is an elevation view partially in section of one embodiment of the invention.

In accordance with the invention, a thermoplastic material is extruded to form a film, the extruded film is passed over a porous quenching surface located between the extrusion die and the frost line of the extruded film, and a temperature controlled quench medium is passed through said porous surface to quench the film below its frost line temperature and to provide lubrication between the quenching surface and the film.

Further in accordance with the invention, additives to improve printability, dyeability, polymer stability, and other film characteristics can be included in the quench medium.

Further in accordance with the invention there is provided a quenching apparatus fabricated with an area of controlled porosity for contact with extruded film.

The term "frost line" in film extrusion is used to designate the point at which as the film cools it reaches the transition between its molten state and its solid state. In the extrusion of polyolefin tubular film this is a ring-shaped zone located at the point where the blown tube reaches its final diameter and assumes a "frosty" appearance. Film is defined in the plastic industry as sheet plastic having a thickness of 10 mils or less.

Although the use of solid surfaces to cool extruded film has been known, there has been difficulty in providing lubrication between such surfaces and the film being cooled thereby. In the present invention, these difficulties have been overcome by providing a surface area of controlled porosity for quenching contact. The contact surface can be made of any suitable porous material, for example, metal compositions such as copper, brass, and Monel metal; ceramic compositions such as alumina silicate; or a metal-ceramic composition can be used. The amount of porosity is determined by the characteristics of the plastic being extruded, film thickness, throughput rate, the coolant being used, etc. Generally pores in the size range of 5–165 microns are effective to transmit the quench medium. Metal having small apertures or slits to impart porosity can be used as the quenching surface. It is preferred to utilize a porous material having high thermal conductivity.

The porous surface can be mounted on any siutable means and a quench medium circulated through the porous surface so that seepage of the quench medium chills the film below its solidification temperature while at the same time providing lubrication between the surface and the extruded film. An excess of the quench medium is avoided to prevent any premature contact with the extrudate. The quench medium can be a liquid or a gas or a gas-liquid mixture, for example, chilled air and water.

If desired, suitable additives can be mixed with the quench medium to improve the printability, dyeability, stability, etc., of the film. For example, an antistatic agent, such as polyethylene glycol, can be added to the quench medium to minimize the static charge which builds up on the film during the wind up step. Rodent repellents are available and can be added to the quench medium. Also, a resin emulsion, such as polyvinyl chloride, can be mixed with the quench medium to provide laminate film.

The temperature of the quench medium circulating through the surface is controlled to obtain the desired rapid cooling and will depend upon extrudate temperature, throughput rates, and the characteristics of the particular plastic.

Referring now to FIGURE 1, illustrating the invention as embodied in a blown tube film process, a plastic is extruded from an extruder 10 through an annular die 11 to form a tube 12. As the tube leaves die 11, it is expanded by a pressurized gas, such as air, introduced through conduit 13.

From die 11, the extruded tube 12 is withdrawn upwardly to quench ring 14. Contact of the tubular film with the porous inner diameter of the quench ring 14 provides the desired rapid cooling. The film frost line is indicated by line 16. Quench ring 14 is of suitable diameter to provide the desired blow-up ratio. Quench ring 14 is located at a distance from die 11 such that the extruding tube can be inflated to the same diameter as the quench ring without being abnormally distended. Guides 17 collapse the film bubble and form a flat double sheet film.

The collapsed tubing is drawn through guides 17 by a pair of pulling rolls 18 and 19 and fed over guide roll 20 to wind up reel 21. FIGURE 1 illustrates an upwardly blown tubular film but the invention is equally applicable to downwardly or horizontally blown tubular film.

Quenching is especially advantageous in achieving optimum physical properties of polyolefins such as linear polyethylene and polypropylene in that it improves optical and physical strength properties.

Figure 2:
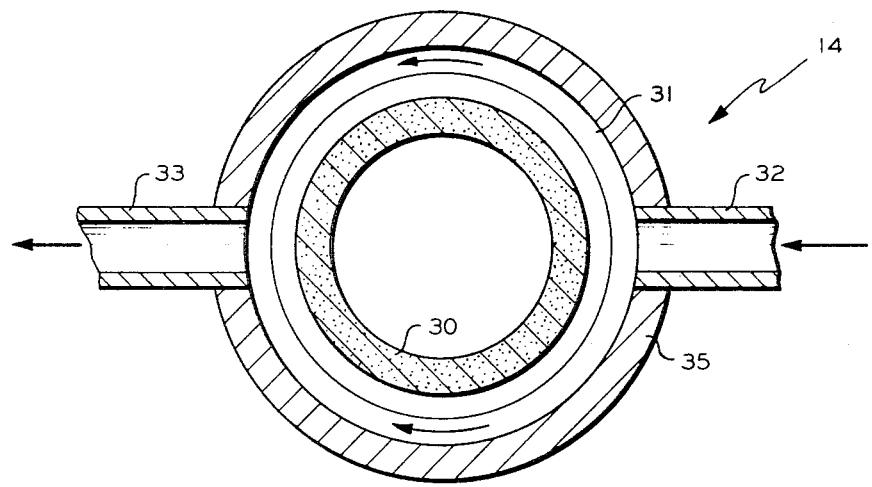
FIGURE 2 illustrates the invention as applied to tubular extruded film production.

FIGURE 2 is a cross sectional view of quench ring 14 showing an inner diameter of porous metal 30 with a passageway 31 having an inlet 32 and outlet 33 for circulation of a quench medium. The exterior ring 35 serves as a mounting ring for the assembly. The pressure of the circulating quench medium can be controlled to obtain the desired amount of flow through porous surface 30. If desired, the quench medium can be circulated to a refrigeration unit, not shown, and recycled to quench ring 14.

Figure 3:
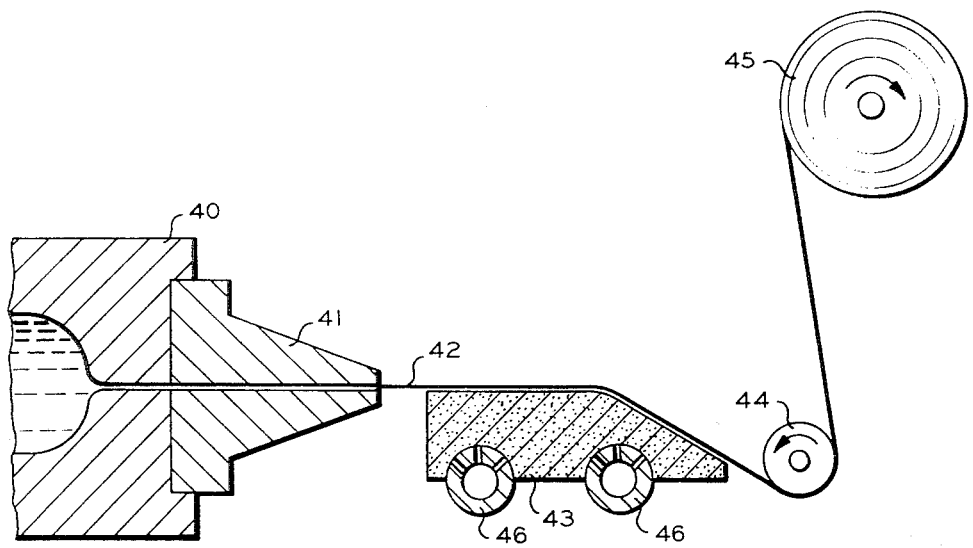
FIGURE 3 shows the invention utilized in conjunction with a slot die.

FIGURE 3 depicts the invention as used in the slot die method of film production. Plastic is extruded from an extruder 40 through slot die 41 in the form of a single sheet of film 42. The extruded film 42 is drawn over porous quench surface 43, under guide roller 44, and taken up on reel 45. Quench surface 43 is provided with conduits 46 for the circulation of the quench medium.

The following example will serve to further illustrate the invention.

Example

Polypropylene resin having a specific gravity of 0.905 and a melt flow of 5 (as measured by ASTM D 1238–62T, Condition L) is melt extruded upwardly by the conventional blown tube method through an annular slit die having a 4 inch diameter and nominal 0.015 inch slit width. The extrudate temperature is about 400° F. The quench ring, which has an 8 inch inner diameter, is constructed from one inch copper tubing with the inner portion of the tubing ring replaced with 1/16 inch thick suitably curved porous copper metal. The ring is mounted 7 inches above the die.

Cold water (40° F.) being in fluid communication with the sintered metal is circulated through the copper tubing. Film is extruded at the rate of 12 feet per minute, blown, and drawn through the quench ring. During contact with the quenching surface there is constant lubrication by that portion of the coolant water which is conducted through the pores of the quenching surface. A double thickness film is produced having desired optical and strength properties using a very simple apparatus.

In the table, properties of film which is produced by the above method are compared with properties of film which is air cooled.

TABLE I.—PHYSICAL PROPERTIES OF QUENCHED AND UNQUENCHED FILM

| Properties | Test Method | Tubular/Film Die Unquenched | Tubular/Film Die Quenched |
|---|---|---|---|
| Tensile tear, g./mil, MD | ASTM D1004-61 | 106 | 361 |
| Tensile tear, g./mil, TD | ASTM D1004-61 | 106 | 393 |
| Elmendorf tear, g./mil, MD | ASTM D1922-61T | 8.8 | 31.1 |
| Elmendorf tear, g./mil, TD | ASTM D1922-61T | 11.9 | 33.0 |
| Tensile, p.s.i., MD | ASTM D882-61T | 4,760 | 4,774 |
| Tensile, p.s.i., TD | ASTM D882-61T | 5,072 | 5,156 |
| Elongation, percent, MD | ASTM D882-61T | 83 | 542 |
| Elongation, percent, TD | ASTM D882-61T | 5 | 502 |
| Haze,[1] percent | ASTM D1003-61 | 74 | 6 |
| Burst strength, inches/mil thickness [2] | | 12/4 | 60/4 |

[1] 4 mil films used in haze determination.
[2] 1″ diameter steel ball dropped onto taut film.

It can be seen that the film quenched according to the invention exhibits better optical and physical strength characteristics than the film which is extruded under the same conditions but is cooled with blown air. Film quenched in a water bath or chill rolled exhibits properties more nearly like those of the tubular quenched film, but the equipment cost is much greater for water baths and chill rolls than for the quench ring.

I claim:
1. A process for producing a plastic film comprising, in combination, the steps of:
   extruding a plastic through an extrusion die to form a film thereof;
   passing the extruded film into contact with a porous quenching surface of porous material selected from the group consisting of metals, ceramics, and metal-ceramics located between said extrusion die and the frost line of the extruded film and having a passageway communicating therewith;
   and circulating a liquid quench medium through said passageway, said surface, and into contact with said film at a controlled rate and temperature sufficient to cool the extruded film below its solidification temperature and permitting said quench medium to seep through said surface in an amount sufficient to provide lubrication between said surface and said film.

2. The process of claim 1 wherein said film is extruded as a tube through an annular die, said surface is a ring of said porous material and said film is blown to expand said film into contact with said surface.

3. The process of claim 1 wherein said film is extruded as a sheet through a slot die, and said film is forced into contact with said surface by guide means.

4. The process of claim 1 wherein said plastic is polyethylene.

5. The process of claim 1 wherein said plastic is polypropylene.

6. The process of claim 1 wherein said quench medium is water.

7. The process of claim 1 wherein said quench medium contains additives to improve film characteristics.

References Cited

UNITED STATES PATENTS

| 2,987,767 | 6/1961 | Berry et al. | 264—95 |
| 3,008,186 | 11/1961 | Voigt | 18—145 |
| 3,226,459 | 12/1965 | Tijunelis | 264—95 |
| 3,321,563 | 5/1967 | Rettig et al. | 264—95 |

ROBERT E. WHITE, Primary Examiner

JEFFERY R. THURLOW, Assistant Examiner

U.S. Cl. X.R.

18—14; 264—177, 209, 237